(12) United States Patent
Takahashi

(10) Patent No.: US 10,520,648 B2
(45) Date of Patent: Dec. 31, 2019

(54) ANTIREFLECTION FILM AND METHOD OF PRODUCING THE SAME

(71) Applicant: FUJIFILM Corporation, Minato-ku, Tokyo (JP)

(72) Inventor: Hiroki Takahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 225 days.

(21) Appl. No.: 15/700,382

(22) Filed: Sep. 11, 2017

(65) Prior Publication Data

US 2018/0011224 A1 Jan. 11, 2018

Related U.S. Application Data

(63) Continuation of application No. PCT/JP2016/060777, filed on Mar. 31, 2016.

(30) Foreign Application Priority Data

Mar. 31, 2015 (JP) ................................. 2015-072641

(51) Int. Cl.
*G02B 1/118* (2015.01)
*G02B 1/115* (2015.01)
*B32B 9/04* (2006.01)
*B32B 37/14* (2006.01)

(52) U.S. Cl.
CPC ................ *G02B 1/118* (2013.01); *B32B 9/04* (2013.01); *B32B 37/14* (2013.01); *G02B 1/115* (2013.01); *B32B 2307/418* (2013.01); *B32B 2309/105* (2013.01)

(58) Field of Classification Search
None
See application file for complete search history.

(56) References Cited

U.S. PATENT DOCUMENTS

| 10,025,006 B2 * | 7/2018 | Yoshizawa ................ B32B 7/02 |
| 10,196,302 B2 * | 2/2019 | Sonoda ................ C03C 17/3411 |
| 2005/0233113 A1 | 10/2005 | Kotani et al. |
| 2009/0022954 A1 | 1/2009 | Kotani et al. |
| 2010/0247863 A1 | 9/2010 | Nakayama |

(Continued)

FOREIGN PATENT DOCUMENTS

| CN | 101852873 A | 10/2010 |
| JP | 3-91701 A | 4/1991 |

(Continued)

OTHER PUBLICATIONS

International Search Report dated Jun. 7, 2016, International Searching Authority in counterpart International Application No. PCT/JP2016/060777 (PCT/ISA/210).

(Continued)

*Primary Examiner* — Derek S. Chapel
(74) *Attorney, Agent, or Firm* — Sughrue Mion, PLLC

(57) ABSTRACT

An antireflection film substrate that is provided on a surface of a substrate includes a surface layer having an alumina hydrate as a main component. The surface layer has an uneven structure in which a volume proportion of the alumina hydrate per unit volume decreases in a direction from the substrate side to a surface side, and a period of apexes distributed on the uneven structure on the surface side is configured to be equal to or less than a wavelength of light of which reflection is to be suppressed.

10 Claims, 7 Drawing Sheets

(56) References Cited

U.S. PATENT DOCUMENTS

| | | |
|---|---|---|
| 2012/0318772 A1 | 12/2012 | Minoura et al. |
| 2013/0027779 A1 | 1/2013 | Okuno et al. |
| 2013/0271842 A1 | 10/2013 | Miyahara et al. |
| 2013/0273317 A1 | 10/2013 | Nakayama |
| 2014/0016204 A1 | 1/2014 | Hakuta et al. |
| 2015/0219798 A1* | 8/2015 | Sonoda .................. G02B 1/118 359/601 |
| 2015/0219799 A1 | 8/2015 | Sonoda et al. |
| 2015/0369967 A1 | 12/2015 | Okuno et al. |
| 2015/0378058 A1* | 12/2015 | Sonoda .................. C03C 17/34 359/601 |
| 2017/0160437 A1 | 6/2017 | Nakayama |
| 2017/0343705 A1* | 11/2017 | Yoshihiro ................. B32B 7/02 |

FOREIGN PATENT DOCUMENTS

| | | |
|---|---|---|
| JP | 4-366901 A | 12/1992 |
| JP | 2005-99536 A | 4/2005 |
| JP | 2005-275372 A | 10/2005 |
| JP | 2012-198330 A | 10/2012 |
| JP | 2013-47780 A | 3/2013 |
| JP | 2013-83871 A | 5/2013 |
| JP | 2013-220573 A | 10/2013 |
| JP | 2014-98885 A | 5/2014 |
| JP | 2015-4871 A | 1/2015 |
| JP | 2015-4919 A | 1/2015 |
| WO | 2011/125486 A1 | 10/2011 |

OTHER PUBLICATIONS

Written Opinion dated Jun. 7, 2016, International Searching Authority in counterpart International Application No. PCT/JP2016/060777 (PCT/ISA/237).

Office Action dated Aug. 1, 2017, by the Japanese Patent Office in counterpart Japanese Application No. 2017-510218.

Chinese Office Action dated Oct. 25, 2018 issued by the State Intellectual Property Office of P.R. China in Counterpart Chinese Application No. 201680018398.9.

* cited by examiner

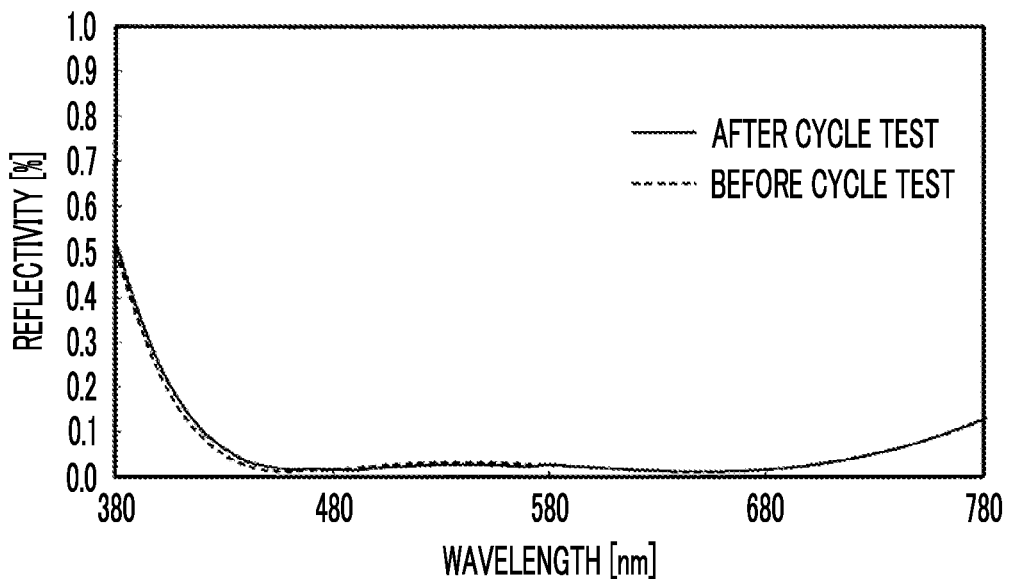
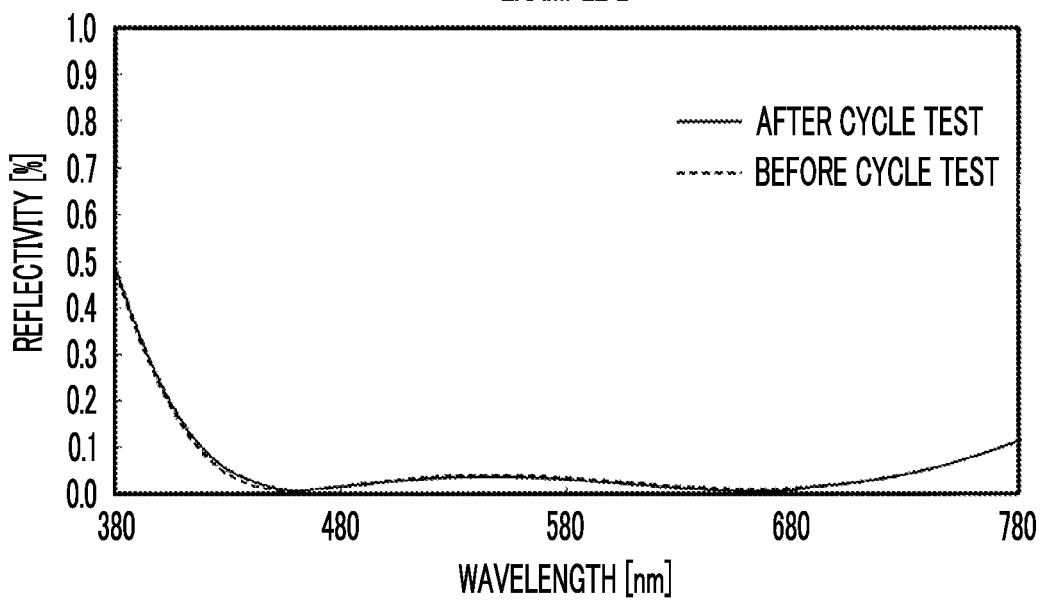

ANTIREFLECTION FILM AND METHOD OF PRODUCING THE SAME

CROSS REFERENCE TO RELATED APPLICATION(S)

This is a continuation of International Application No. PCT/JP2016/060777 filed on Mar. 31, 2016, and claims priority from Japanese Patent Application No. 2015-072641 filed on Mar. 31, 2015, the entire disclosures of which are incorporated herein by reference.

BACKGROUND OF THE INVENTION

1. Field of the Invention

The present invention relates to an antireflection film having an uneven structure on its surface and a method of producing the same.

2. Description of the Related Art

In the past, in a lens (transparent substrate) using a translucent member such as glass or plastic, an antireflection film has been provided on a light incident surface in order to reduce the loss of transmitted light by surface reflection.

For example, as an antireflection structure for visible light, a dielectric material multilayer film, a fine uneven layer having a pitch shorter than a wavelength of visible light, and the like have been known (JP2005-275372A, JP2013-47780A, and JP2015-4919A and the like).

Generally, the refractive index of a material forming a fine uneven layer is different from the refractive index of a transparent substrate. Accordingly, in the case in which the material is used for antireflection of the transparent substrate, it is necessary to adjust a difference in refractive index between the uneven layer and the transparent substrate.

JP2005-275372A discloses a constitution in which a fine uneven layer, which is obtained by boehmitization of alumina, is formed on a substrate with a thin transparent film layer (intermediate layer) interposed therebetween.

In addition, JP2013-47780A discloses a constitution in which as intermediate layers between a substrate and a fine uneven layer obtained by boehmitization of alumina, two adjustment layers having an intermediate refractive index between the refractive index of the uneven layer and the refractive index of the substrate, specifically, first and second adjustment layers having a relationship of the refractive index of the substrate>the refractive index of the first adjustment layer>the refractive index of the second adjustment layer>the refractive index of the uneven layer, are arranged from the substrate side in the order of first adjustment layer and second adjustment layer.

Further, JP2015-4919A discloses a constitution having an intermediate layer of a five-layer structure.

SUMMARY OF THE INVENTION

While having conducted more intensive investigations on an antireflection structure including an uneven structure layer, the present inventors have found that when an antireflection structure includes an uneven structure layer made of an alumina hydrate, there is a problem in that slight scattering light at an unignorable level is generated and recognized as a cloud on an antireflection film forming surface in a product such as a lens so that the quality of an optical element is significantly affected by the light in some cases.

The present invention is made in consideration of the above circumstances and an object thereof is to provide an antireflection film capable of suppressing scattered light and a method of producing the same.

According to an aspect of the present invention, there is provided an antireflection film comprising: a surface layer having an alumina hydrate as a main component, in which the surface layer has only an uneven structure in which a volume proportion of the alumina hydrate per unit volume decreases in a direction from a substrate side to a surface side, and a period of apexes distributed to the uneven structure on the surface side is configured to be equal to or less than a wavelength of light of which reflection is to be suppressed, an adhesion layer adjacent to the substrate side of the surface layer and formed of hydrogenated metal oxide, metal oxide, or metal fluoride is provided, and a thermal expansion coefficient value of the adhesion layer at a reference temperature of 25° C. is in a range of $0.65 \times 10^{-6}$ to $19 \times 10^{-6}$/K, and a difference in refractive index between the adhesion layer and the surface layer at an interface is 0.2 or more and 1.15 or less.

According to another aspect of the present invention, there is provided a method of producing an antireflection film comprising: subjecting a surface layer portion formed on a surface of a substrate and having aluminum or alumina as a main component to a hydrothermal treatment, in which the surface layer portion is subjected to the hydrothermal treatment until the surface layer portion has only an uneven structure having an alumina hydrate as a main component, and the uneven structure is a structure in which a volume proportion of the alumina hydrate which forms the surface layer portion per unit volume decreases in a direction from a substrate side to a surface side of the surface layer portion.

According to the present invention, it is possible to provide an antireflection film capable of suppressing scattered light and a method of producing the same.

BRIEF DESCRIPTION OF THE DRAWINGS

FIG. 8 is a view showing wavelength dependence of a reflectivity of an optical member of Example 1.

FIG. 9 is a view showing wavelength dependence of a reflectivity of an optical member of Example 2.

DESCRIPTION OF THE PREFERRED EMBODIMENTS

Hereinafter, embodiments of the present invention will be described with reference to drawings. A refractive index value, particularly, a refractive index value at a wavelength which is not designated, refers to a refractive index with respect to light having a wavelength of 550 nm.

First Embodiment

Figure 1:
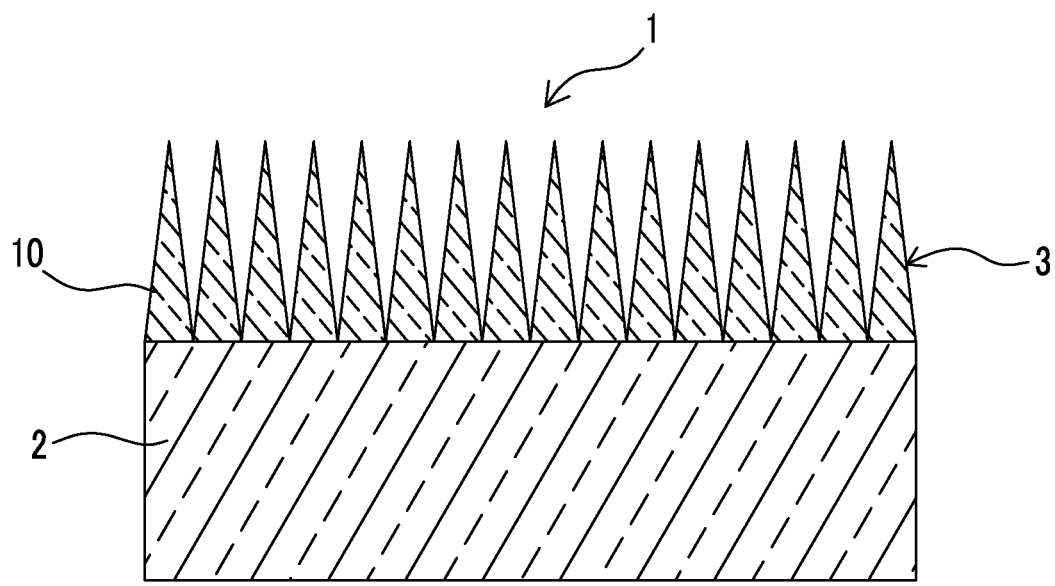
FIG. 1 is a schematic cross-sectional view showing a schematic constitution of an optical member provided with an antireflection film according to a first embodiment of the present invention.

FIG. 1 is a schematic cross-sectional view showing a schematic constitution of an optical member provided with an antireflection film according to a first embodiment of the present invention. In addition, FIG. 2 is an electron microscope image obtained by imaging a cross section of the optical member provided with the antireflection film according to the first embodiment of the present invention in an enlarged manner.

Figure 2:
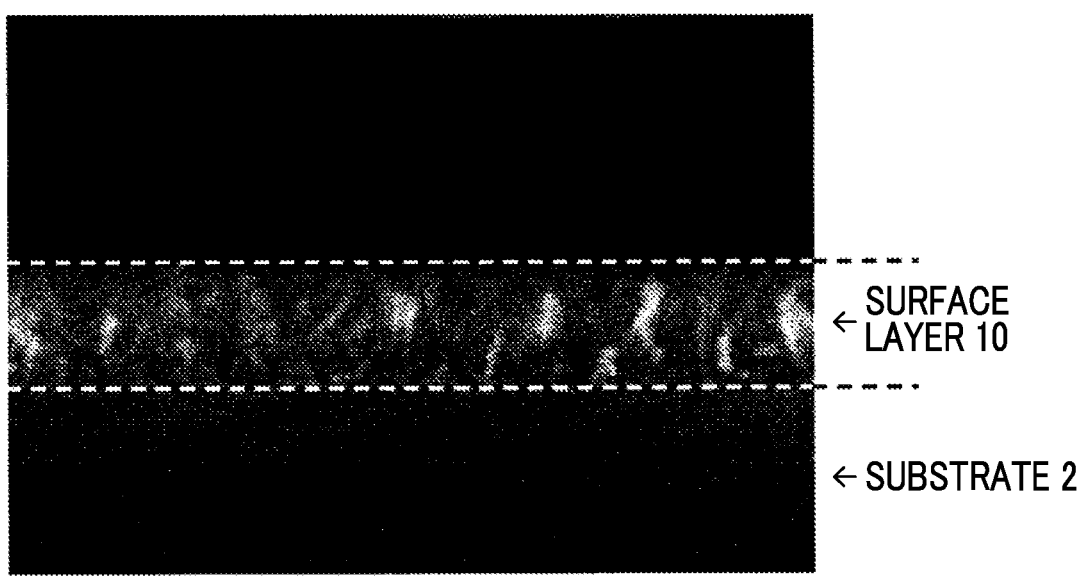
FIG. 2 is an electron microscope image obtained by imaging a cross section of the optical member provided with the antireflection film according to the first embodiment of the present invention in an enlarged manner.

As shown in FIGS. 1 and 2, an optical member 1 of the first embodiment includes a transparent substrate 2, and an antireflection film 3 that is formed on a surface of the substrate 2. The antireflection film 3 includes a transparent surface layer 10 having an alumina hydrate as a main component, and the surface layer 10 has an uneven structure in which a volume proportion of the alumina hydrate per unit volume decreases in a direction from the substrate 2 side to the surface side. In the surface layer 10, a period of apexes distributed on the surface side is arranged so as to be equal to or less than the wavelength of light of which reflection is to be suppressed. The light of which reflection is to be suppressed varies depending on the purpose but is generally light in a visible light region. As necessary, light in an infrared region may be covered. In the embodiment, light in a visible light region (380 nm to 780 nm) is mainly targeted.

The shape of the substrate 2 is not particularly limited and the substrate is an optical element that is mainly used in an optical device such as a flat plate, a concave lens, or a convex lens and also may be a substrate constituted by a combination of a curved surface having a positive or negative curvature and a flat surface. As the material for the substrate 2, glass, plastic, and the like can be used. Here, the term "transparent" means being transparent (having an internal transmittance of about 10% or more) to a wavelength of light of which reflection is to be suppressed (reflection prevention target light) in the optical member. The refractive index of the substrate 2 is preferably 1.45 or more and 2.10 or less.

The film thickness of the surface layer 10 is less than 230 nm. The alumina hydrate constituting the surface layer 10 is boehmite (denoted as $Al_2O_3 \cdot H_2O$ or $AlOOH$) which is an alumina monohydrate, bayerite (denoted as $Al_2O_3 \cdot 3H_2O$ or $Al(OH)_3$) which is an alumina trihydrate (aluminum hydroxide), or the like.

The surface layer 10 is transparent and has various sizes (sizes of apex angles) and directions of protrusions but has a substantially saw-teeth-shaped cross section. The distance between the protrusions of the surface layer 10 is a distance between the apexes of the most adjacent protrusions with a recess interposed therebetween. The distance is equal to or less than the wavelength of the light of which reflection is to be suppressed and is in an order of several tens of nanometers to several hundreds of nanometers. The distance is preferably 150 nm or less and more preferably 100 nm or less. The surface layer 10 has a region in which voids are most sparse on the surface side in contact with a layer of air and the refractive index is gradually increased from 1.0 in a thickness direction from the surface side in contact with the layer of air to the substrate 2 side.

The average distance between the protrusions is obtained by photographing a surface image of the fine uneven structure with a scanning electron microscope (SEM), subjecting the image to image processing to binarize the image, and carrying out statistical processing.

Figure 3:
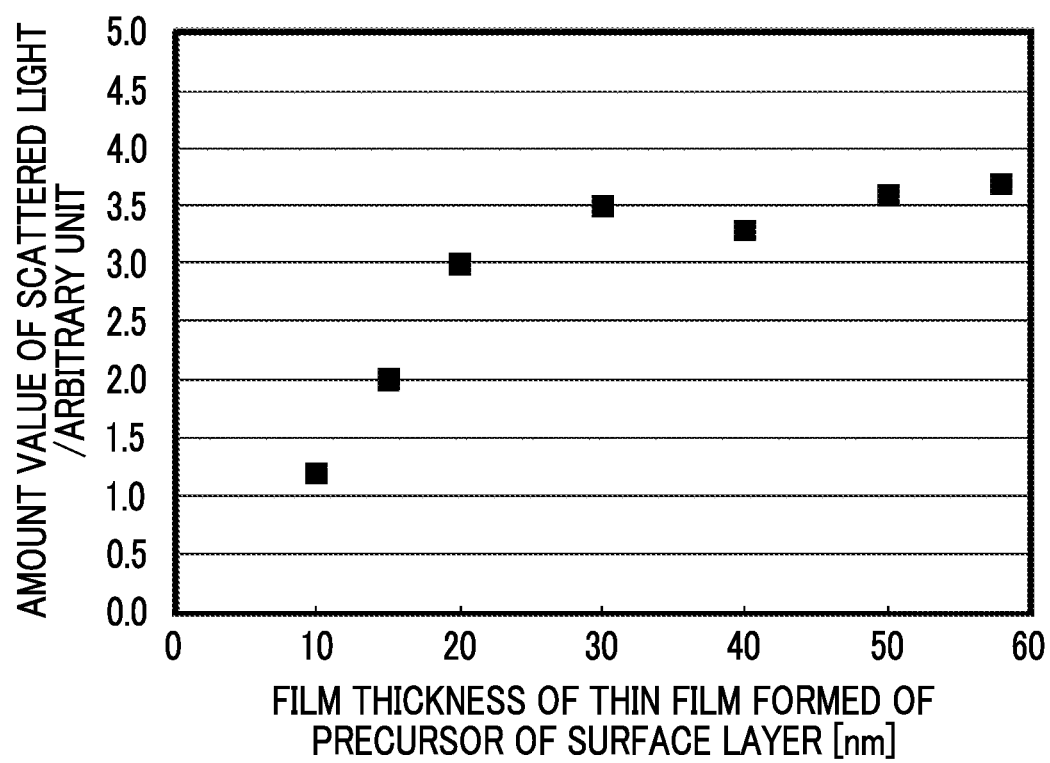
FIG. 3 is a graph showing an amount of scattered light of the optical member with respect to a film thickness of a thin film formed of a precursor of a surface layer.

It is known that the surface layer 10 having an alumina hydrate as a main component is generally obtained by forming a thin film of aluminum or a compound including aluminum, particularly, alumina, on the surface layer portion of the substrate 2, and subjecting the surface layer portion to a hydrothermal treatment. As shown in FIG. 3, in the case in which a film thickness of a thin film formed of this material (aluminum or alumina) which becomes a precursor of the surface layer 10 is 20 nm or less, the amount of scattered light of the optical member is reduced. FIG. 3 is a graph showing an amount of scattered light of the optical member with respect to a film thickness of a thin film to be formed of a precursor of the surface layer 10. Therefore, at the time of producing the antireflection film 3, the thin film of aluminum or alumina is formed to have a film thickness of 20 nm or less and this thin film is subjected to a hydrothermal treatment until the thin film has a surface layer 10 having only an uneven structure. In this case, the refractive index of the surface layer 10 having an uneven structure is changed from 1 to 1.27 from the air side to the substrate 2 side.

Figure 4:
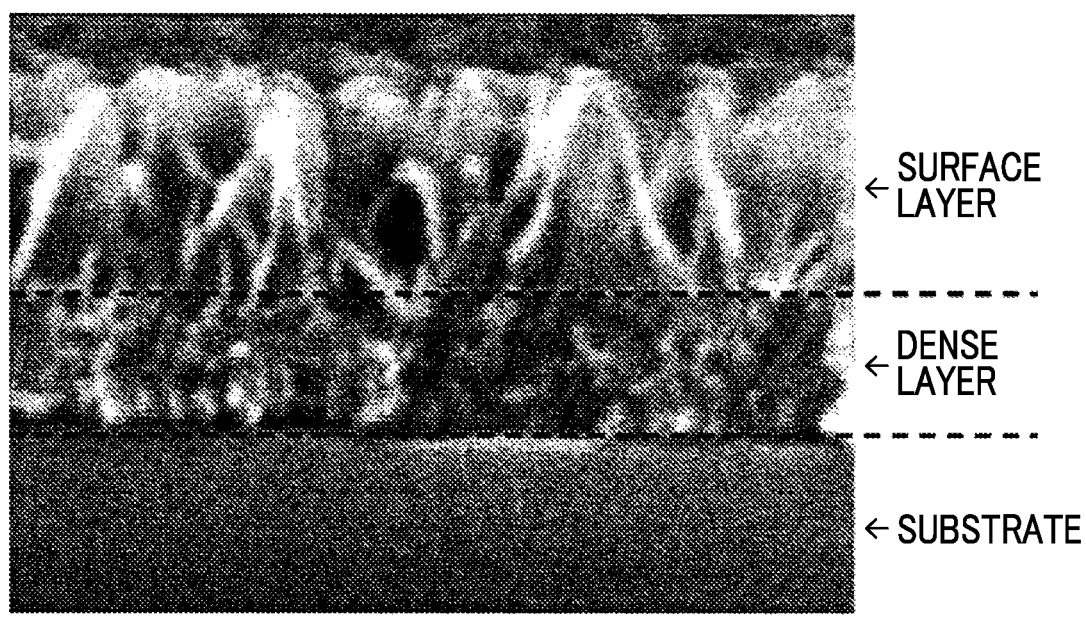
FIG. 4 is an electron microscope image obtained by imaging a cross section of an optical member provided with an antireflection film in which a dense layer is formed in an enlarged manner.

On the other hand, in the case in which a thin film of aluminum or alumina having a film thickness of more than 20 nm is subjected to a hydrothermal treatment, a dense layer having an alumina hydrate as a main component is formed under the surface layer. FIG. 4 is an electron microscope image obtained by imaging a cross section of an optical member provided with an antireflection film in which a dense layer is formed. As shown in FIG. 4, the dense layer is formed on the substrate side of the surface layer having an uneven structure and has a structure with a distribution in refractive index. That is, a portion having a high refractive index and a portion having a low refractive index are mixed in the dense layer. In the dense layer having such a refractive index distribution structure, light is scattered to cause haze in the optical member.

The film thickness of the surface layer 10 obtained by subjecting a thin aluminum film having a film thickness of less than 20 nm to a hydrothermal treatment is about 230 nm. From the viewpoint of antireflection performance, the film thickness of the surface layer 10 is preferably more than 100 nm and more preferably 140 nm or more. From the viewpoint of suppressing scattered light and obtaining antireflection performance, the film thickness is most preferably 200 nm or more and 250 nm or less. Here, the film thickness of the surface layer 10 is defined as a thickness from the position of an interface between the surface layer and the substrate 2 to the protrusion tip end and is measured from an electron microscope image of a cross section of a sample.

As described above, in the embodiment, the film thickness of aluminum or alumina formed in the surface layer portion of the substrate 2 is 20 nm or less, and in the case of subjecting the surface layer portion to a hydrothermal treatment, only the surface layer 10 having an uneven structure is formed without forming a dense layer. In the antireflection film 3 in which a dense layer is not formed, antireflection performance functions due to the uneven structure of the surface layer 10 while scattered light is suppressed.

Second Embodiment

In the antireflection film 3 of the first embodiment, scattered light is suppressed because a dense layer is not formed. However, in the case in which a reliability test such as a temperature cycle test is performed, peeling-off occurs at the interface between the surface layer 10 and the substrate due to a difference in thermal expansion coefficient between the surface layer 10 and the substrate 2 and changes in temperature during the test, and a layer of air is formed in the peeled-off portion. Thus, it has been newly found that the reflective properties of the antireflection film 3 deteriorate in some cases.

Figure 5:
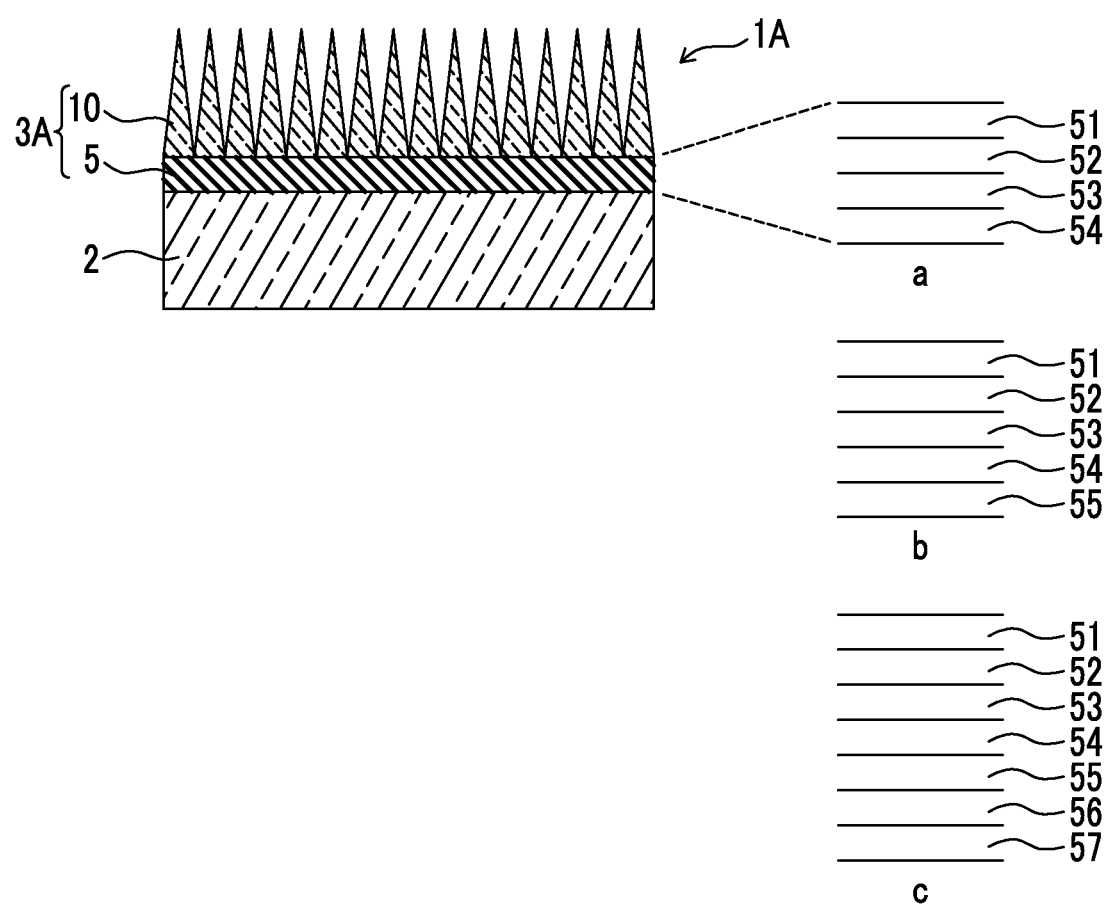
FIG. 5 is a schematic cross-sectional view showing a schematic constitution of an optical member provided with an antireflection film according to a second embodiment of the present invention.
Figure 6:
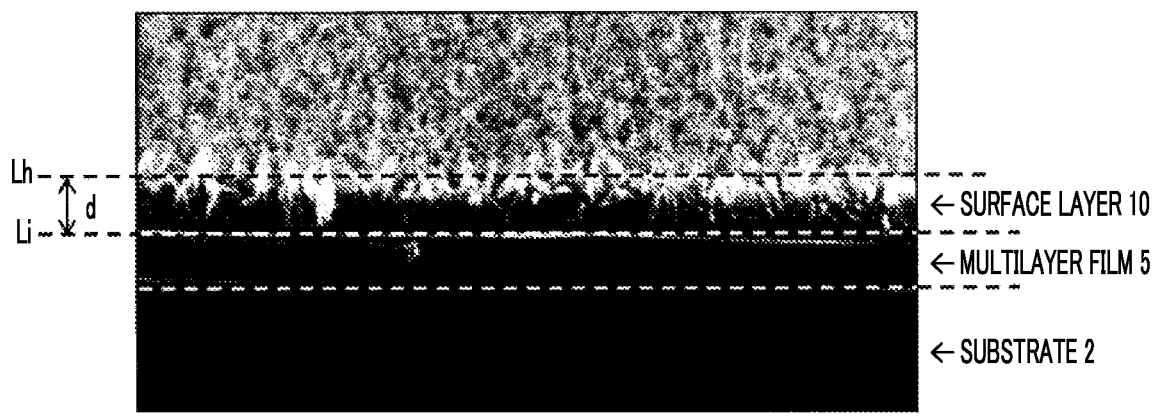
FIG. 6 is an electron microscope image obtained by imaging a cross section of the optical member provided with the antireflection film according to the second embodiment of the present invention in an enlarged manner.

FIG. 5 is a schematic cross-sectional view showing a schematic constitution of an optical member provided with an antireflection film according to the second embodiment of the present invention. In addition, FIG. 6 is an electron microscope image obtained by imaging a cross section of the optical member provided with the antireflection film according to the second embodiment of the present invention in an enlarged manner. The optical member of the second embodiment is different from the optical member 1 of the first embodiment in that the antireflection film has a multilayer film between the surface layer 10 and the substrate 2. Therefore, constitutional elements the same or similar to those of the first embodiment are assigned with the same reference numerals or the corresponding reference numerals and the descriptions thereof will be simplified or omitted.

As shown in FIGS. 5 and 6, an optical member 1A of the second embodiment includes a substrate 2 that is a substrate, and an antireflection film 3A that is formed on a surface of the substrate 2. The antireflection film 3A includes a surface layer 10 having an alumina hydrate as a main component, and a multilayer film 5 that is formed of 4 or more layers and is disposed between the surface layer 10 and the substrate 2. The surface layer 10 has an uneven structure in which the volume proportion of the alumina hydrate per unit volume decreases in a direction from the substrate 2 side to the surface side, as in first embodiment. On the surface layer 10, a period of apexes distributed on the surface side is arranged so as to be equal to or less than the wavelength of light of which reflection is to be suppressed. The light of which reflection is to be suppressed varies depending on the purpose but is generally light in a visible light region. As necessary, light in an infrared region may be covered. In the embodiment, light in a visible light region (380 nm to 780 nm) is mainly targeted.

In the embodiment, the film thickness of the surface layer 10 obtained by subjecting a thin aluminum film having a film thickness of less than 20 nm to a hydrothermal treatment is about 230 nm. From the viewpoint of antireflection performance, the film thickness of the surface layer 10 is preferably more than 100 nm and more preferably 140 nm or less. From the viewpoint of suppressing scattered light and obtaining antireflection performance, the film thickness is most preferably 200 nm or more and 250 nm or less. Here, the film thickness of the surface layer 10 is defined as a thickness from the position of an interface between the surface layer and the substrate 2 to the protrusion tip end and is measured from an electron microscope image of a cross section of a sample.

A specific method of measuring the film thickness will be described with reference to FIG. 6. The multilayer film 5 does not have a structure in an in-plane direction along the laminated surface (a left and right direction in the image of FIG. 6) and the surface layer 10 has a structure in the in-plane direction. Thus, an interface between a region having a structure in the in-plane direction and a region not having a structure in the in-plane direction in the electron microscope cross-sectional image of the sample is defined as an interface between the multilayer film 5 and the surface layer 10. Next, out of linear lines parallel with a linear line Li indicating the interface between the multilayer film 5 and the surface layer 10, a linear line that passes through a region in which the surface layer 10 is present and has the largest distance with the linear line Li is defined as a linear line Lh that passes through the protrusion tip ends of the surface layer 10. At this time, a distance d between two parallel linear lines Li and Lh is defined as the film thickness of the surface layer 10. For the electron microscope image used for measurement of the film thickness of the surface layer 10, it is necessary to set an imaging range for imaging the optical member over a region of at least 1 μm or more in an in-plane direction.

The multilayer film 5 is formed of a plurality of layers including, in this order, at least a first layer 51, a second layer 52, a third layer 53, and a fourth layer 54 from the surface layer 10 side to the substrate 2 side as shown in a of FIG. 5. In addition, the multilayer film 5 may further include a fifth layer 55 as shown in b of FIG. 5 or may further include a fifth layer 55 and a sixth layer 56 as shown in c of FIG. 5. Among the plurality of layers constituting the multilayer film 5, the first layer 51 of the surface layer 10 adjacent to the substrate 2 side and functioning as an adhesion layer is formed of a hydrogenated metal oxide, a metal oxide, or a metal fluoride, of which the thermal expansion coefficient is an intermediate value of the thermal expansion coefficients of the surface layer 10 and the second layer 52. The thermal expansion coefficient value of the first layer 51 is in a range of $0.65 \times 10^{-6}$ to $19 \times 10^{-6}$/K at a reference temperature of 25° C. In addition, in the multilayer film 5, a preferable refractive index lower limit of the refractive index of the first layer 51 is a value having a difference of 0.2 or greater between the refractive index of the first layer and the refractive index of the surface layer 10 (refractive index: 1.27), and a preferable refractive index upper limit thereof is a value having a difference of 1.15 or less between the refractive index of the first layer and the refractive index of the surface layer 10 (refractive index: 1.27). By suppressing the refractive index difference between the refractive index of the surface layer 10 (only the uneven layer) and the refractive index of the first layer 51 of the multilayer film 5 in the above range, it is possible to reduce clouding between the surface layer 10 and the first layer 51 and to reduce reflectivity. Further, in the multilayer film 5, a more preferable refractive index lower limit of the refractive index of the first layer 51 is a value having a difference of 0.25 or greater between the refractive index of the first layer and the refractive index of the surface layer 10 (refractive index:

1.27) and a more preferable refractive index upper limit thereof is a value having a difference of 1.1 or less between the refractive index of the first layer and the refractive index of the surface layer 10 (refractive index: 1.27). When the refractive index difference between the refractive index of the surface layer 10 (only the uneven layer) and the refractive index of the first layer 51 of the multilayer film 5 is in the above range, lower reflective properties can be obtained at a wavelength of 380 to 780 nm.

In addition, at least the second layer 52 and the subsequent layers of the multilayer film 5 are arranged such that a layer having a refractive index less than a predetermined value (hereinafter, sometimes referred to as a "low refractive index layer") and a layer having a refractive index equal to or greater than a predetermined value (hereinafter, sometimes referred to as a "high refractive index layer") are alternately arranged.

In the multilayer film 5, a preferable refractive index lower limit of the low refractive index layer is 1.50 and a preferable refractive index upper limit of the high refractive index layer is 2.40.

The low refractive index layers may not be formed of the same material and may not have the same refractive index. However, it is preferable that the low refractive index layers are formed of the same material and have the same refractive index from the viewpoint of suppressing material costs, film formation costs, and the like. Similarly, the high refractive index layers may not be formed of the same material and may not have the same refractive index. However, it is preferable that the high refractive index layers are formed of the same material and have the same refractive index from the viewpoint of suppressing material costs, film formation costs, and the like.

Examples of materials for the low refractive index layer include silicon oxynitride, gallium oxide, aluminum oxide, lanthanum oxide, lanthanum fluoride, magnesium fluoride, hydrogenated silicon oxide, and nitrided silicon oxide.

Examples of materials for the high refractive index layer include niobium oxide, silicon niobium oxide, zirconium oxide, tantalum oxide, silicon nitride, titanium oxide, and hydrogenated silicon oxide.

Figure 7:
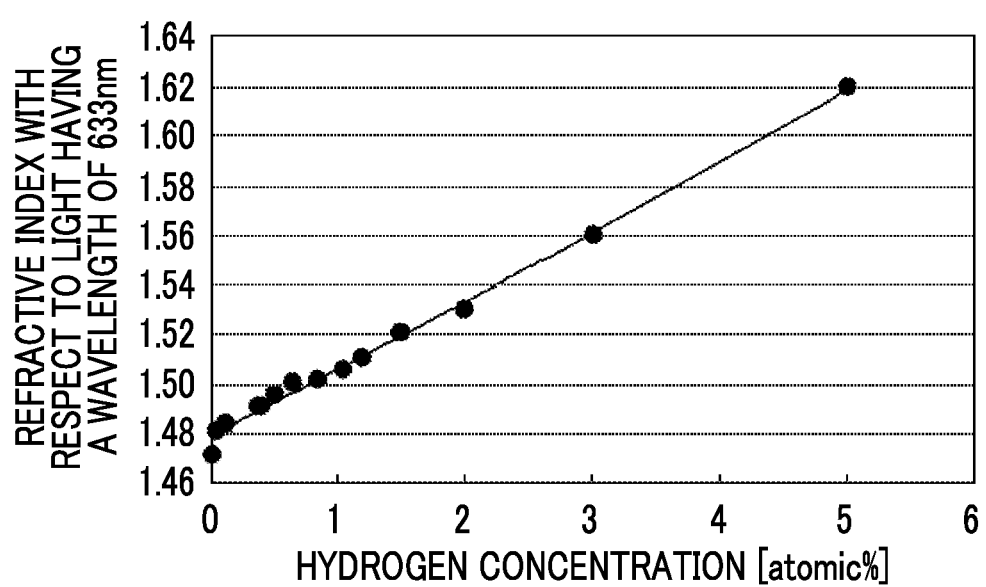
FIG. 7 is a graph showing a relationship between a hydrogen concentration and a refractive index of a single

As long as the difference in refractive index between the surface layer 10 and the multilayer film 5 defined in the embodiment satisfies the above condition and the refractive index of each of the low refractive index layer and the high refractive index layer satisfies the above condition, all the layers constituting the multilayer film 5 including the first layer 51 may be formed of hydrogenated silicon oxide. In this case, the multilayer film 5 having different refractive indexes can be formed by changing the hydrogen concentration of each layer at the time of film formation. The hydrogen concentration in each layer has any value in a range of 0.05 atomic % to 5.02 atomic %. FIG. 7 is a graph showing a relationship between the hydrogen concentration in a single layer formed of hydrogenated silicon oxide and the refractive index with respect to light having a wavelength of 633 nm. The refractive index is measured using a Model: 2010/M, manufactured by Metricon Corporation. In addition, the hydrogen concentration is measured using elastic recoil detection analysis (ERDA). In the measurement, the incident beam used is a 2.275 MeV He++ ion and the beam irradiation is set to 50 µC. The angle formed between the incident beam and a sample is set to 15° and the angle of a detector is set to 30°. In addition, to determine the amount of hydrogen, a standard sample obtained by injecting hydrogen into the silicon substrate in an amount of $1 \times 10^{17}$ atom/cm$^2$ is used. As shown in FIG. 7, the refractive index of the single layer formed of hydrogenated silicon oxide is increased to be substantially proportional to the hydrogen concentration. Therefore, the multilayer film 5 in which all the layers are formed of hydrogenated silicon oxide has a hydrogen concentration in a range of 0.05 atomic % to 5.02 atomic % and is formed such that a layer of hydrogenated silicon oxide having a hydrogen concentration (for example, 5.02 atomic %) corresponding to a preferable refractive index (for example, 1.6197) of the high refractive index layer, and a layer of hydrogenated silicon oxide having a hydrogen concentration (for example, 0.05 atomic %) corresponding to a preferable refractive index (for example, 1.4701) of the low refractive index layer are alternately laminated.

In the film formation of each layer of the multilayer film 5, it is preferable to use a vapor phase film formation method such as vacuum deposition, plasma sputtering, electron cyclotron sputtering, ion plating, or metamode sputtering. According to the vapor phase film formation, a laminated structure having various refractive indexes and layer thicknesses can be easily formed. In addition, the surface layer 10 is formed by forming a thin film of aluminum or alumina on the surface layer portion of the multilayer film 5 and subjecting the surface layer portion to a hydrothermal treatment as in the first embodiment.

The multilayer film 5 having the above constitution can be widely used to maintain antireflection performance in the case in which the antireflection film 3A includes a thin surface layer 10 having a film thickness of less than 230 nm.

Accordingly, in the embodiment, the multilayer film 5 is formed on the surface of the substrate 2 and the surface layer 10 is formed on the surface of the multilayer film 5. At the time of film formation of the surface layer 10, a hydrothermal treatment is performed and then a reliability test such as a temperature cycle test or the like is performed. Thus, thermal stress is generated in the antireflection film 3A. The thermal stress is obtained by multiplying a difference in thermal expansion coefficient between two adjacent layers and a difference in temperature at the time of the hydrothermal treatment. In the embodiment, since the thermal expansion coefficient of the first layer 51 adjacent to the surface layer 10 among the plurality of layers constituting the multilayer film 5 is an intermediate value of the thermal expansion coefficients of the surface layer 10 and the second layer 52, the thermal stress generated on the substrate 2 side of the surface layer 10 is small. Therefore, the surface layer 10 is not peeled off even at the time of the hydrothermal treatment or at the time of the following reliability test. As described above, in the optical member in which the surface layer 10 is peeled off, a layer of air is formed in the peeled-off portion and thus reflection properties are deteriorated.

In addition, the multilayer film 5 provided between the substrate 2 and the surface layer 10 is a film having an antireflection function constituted such that a low refractive index layer and a high refractive index layer are alternately arranged, and is designed such that a reflection component generated due to a difference between the refractive index of the surface layer 10 and the refractive index of the substrate 2 is substantially zero. Therefore, even in the case in which antireflection performance is low due to the thin surface layer 10, the antireflection performance of the antireflection film 3A can be maintained due to the antireflection function by the multilayer film 5.

In the first and second embodiments, the optical members 1 and 1A in which the antireflection films 3 and 3A are formed on the surface of the substrate 2 have been described above but the antireflection film of the present invention can be formed in any member having a surface which has to prevent reflection of light. For example, it is considered that the antireflection film is provided on the surface of an absorbing body which absorbs more than 90% of incident light to prevent reflection and improve absorption performance.

EXAMPLES

Hereinafter, examples of the present invention will be described and the constitutions and effects of the present invention will be more specifically described.

Example 1

A multilayer film in which layers of tantalum pentoxide (refractive index: 2.13755) as a high refractive index layer, and magnesium fluoride (refractive index: 1.38441) as a low refractive index layer were alternately laminated on a concave lens (curvature radius: 17 mm) made of FDS90 (manufactured by HOYA Corporation, refractive index: 1.8541) as a substrate included first to fourth layers. The thermal expansion coefficient value of the first layer formed of tantalum pentoxide as an adhesion layer is $9 \times 10^{-6}$/K at a reference temperature of 25° C. In the surface layer portion of the first layer, a thin aluminum film having a film thickness of 20 nm was formed as a precursor of the surface layer having an uneven structure. The refractive index of the surface layer having the uneven structure is changed from 1 to 1.27 from the air side to the substrate side. The layer constitution from the substrate to the thin aluminum film is as shown in Table 1 below.

In Table 1, the refractive index and the film thickness of each layer are design values and sputtering conditions and sputtering time to obtain the refractive index and the film thickness shown in the table are set based on a target composition, a relationship between sputtering conditions such as a gas flow rate at the time of sputtering and a refractive index, and a relationship between the thickness of a formed film and sputtering time obtained in advance to form a film. The same will be applied to the following examples. The film thicknesses are all physical film thicknesses.

Then, the film was treated with hot water by immersing the film in hot water heated to 100° C. for 3 minutes to prepare a surface layer having a transparent uneven structure having an alumina hydrate as a main component. Thus, an optical member provided with an antireflection film of Example 1 was obtained.

TABLE 1

| EXAMPLE 1 (TABLE 1) | Material | Refractive index | Film thickness [nm] |
|---|---|---|---|
| Precursor | Al | 1 → 1.27 | 20 |
| First layer | Ta$_2$O$_5$ | 2.13755 | 13.93 |
| Second layer | MgF$_2$ | 1.38441 | 39.81 |
| Third layer | Ta$_2$O$_5$ | 2.13755 | 16.82 |
| Fourth layer | MgF$_2$ | 1.38441 | 13.44 |
| Substrate | FDS90 | 1.8541 | — |

The wavelength dependence of the reflectivity of the antireflection film (hereinafter, referred to "wavelength dependence of the reflectivity of the optical member") of the optical member provided with the antireflection film of the example was measured before and after a reliability test (cycle test) in which the temperature was alternately changed 24 times in a range of 85° C. and −40° C. The reflectivity was measured under the condition of an incident angle of 0°. The reflectivity was measured in the same manner in the following examples. The measurement results are shown in FIG. 8. As shown in FIG. 8, since a change in the average reflection properties of the antireflection film of the example before and after the cycle test was 0.05% or less, peeling-off of the surface layer due to thermal stress does not occur. Even in the case in which the reliability test in which the film was left to stand at a high temperature of 85° C. for 24 hours was performed or the reliability test in which the film was left to stand at a low temperature of −40° C. for 24 hours was performed, peeling-off of the surface layer due to thermal stress did not occur. The average reflectivity exhibiting the above-described average reflection properties is expressed by a value obtained by measuring the reflectivity of light having a wavelength of 380 nm to 780 nm at an interval of 1 nm to obtain a total sum of reflectivity, and dividing the total sum of reflectivity by the number of data.

Example 2

A multilayer film in which layers of tantalum pentoxide (refractive index: 2.13755) as a high refractive index layer, and magnesium fluoride (refractive index: 1.38441) as a low refractive index layer were alternately laminated on a concave lens (curvature radius: 17 mm) made of FDS90 (manufactured by HOYA Corporation, refractive index: 1.8541) as a substrate included first to fifth layers. The thermal expansion coefficient value of the first layer formed of tantalum pentoxide and functioning as an adhesion layer is $9 \times 10^{-6}$/K at a reference temperature of 25° C. In the surface layer portion of the first layer, a thin aluminum film having a film thickness of 20 nm was formed as a precursor of the surface layer having an uneven structure. The refractive index of the surface layer having the uneven structure is changed from 1 to 1.27 from the air side to the substrate side. The layer constitution from the substrate to the thin aluminum film is as shown in Table 2 below.

Then, the film was treated with hot water by immersing the film in hot water heated to 100° C. for 3 minutes to prepare a surface layer having a transparent uneven structure having an alumina hydrate as a main component. Thus, an optical member provided with an antireflection film of Example 2 was obtained.

TABLE 2

| EXAMPLE 2 (TABLE 2) | Material | Refractive index | Film thickness [nm] |
|---|---|---|---|
| Precursor | Al | 1 → 1.27 | 20 |
| First layer | Ta$_2$O$_5$ | 2.13755 | 13.80 |
| Second layer | MgF$_2$ | 1.38441 | 40.18 |
| Third layer | Ta$_2$O$_5$ | 2.13755 | 16.86 |
| Fourth layer | MgF$_2$ | 1.38441 | 15.99 |
| Fifth layer | Ta$_2$O$_5$ | 2.13755 | 3.32 |
| Substrate | FDS90 | 1.8541 | — |

The wavelength dependence of the reflectivity of the antireflection film (hereinafter, referred to "wavelength dependence of the reflectivity of the optical member") of the optical member provided with the antireflection film of the example was measured before and after a reliability test (cycle test) in which the temperature was alternately changed 24 times in a range of 85° C. and −40° C. The reflectivity was measured under the condition of an incident angle of 0°. The reflectivity was measured in the same manner in the following examples. The measurement results are shown in FIG. 9. As shown in FIG. 9, since a change in the average reflection properties of the antireflection film of the example before and after the cycle test was 0.05% or less, peeling-off of the surface layer due to thermal stress does not occur. Even in the case in which the reliability test in which the film was left to stand at a high temperature of 85° C. for 24 hours was performed or the reliability test in which the film was left to stand at a low temperature of −40° C. for 24 hours was performed, peeling-off of the surface layer due to thermal stress did not occur.

Examples 3

A multilayer film in which layers of titanium oxide (refractive index: 2.3194) as a high refractive index layer, and aluminum oxide (refractive index: 1.6632) as a low refractive index layer were alternately laminated on a concave lens (curvature radius: 17 mm) made of FDS90 (manufactured by HOYA Corporation, refractive index: 1.8541) as a substrate included first to fourth layers. The thermal expansion coefficient value of the first layer formed of titanium oxide and functioning as an adhesion layer is 2 to 6×10$^{-6}$/K at a reference temperature of 25° C. In the surface layer portion of the first layer, a thin aluminum film having a film thickness of 20 nm was formed as a precursor of the surface layer having an uneven structure. The refractive index of the surface layer having the uneven structure is changed from 1 to 1.27 from the air side to the substrate side. The layer constitution from the substrate to the thin aluminum film is as shown in Table 3 below.

Then, the film was treated with hot water by immersing the film in hot water heated to 100° C. for 3 minutes to prepare a surface layer having a transparent uneven structure having an alumina hydrate as a main component. Thus, an optical member provided with an antireflection film of Example 3 was obtained.

TABLE 3

| EXAMPLE 3 (TABLE 3) | Material | Refractive index | Film thickness [nm] |
|---|---|---|---|
| Precursor | Al | 1 → 1.27 | 20 |
| First layer | TiO$_2$ | 2.3194 | 6.00 |
| Second layer | Al$_2$O$_3$ | 1.6632 | 73.08 |
| Third layer | TiO$_2$ | 2.3194 | 9.18 |
| Fourth layer | Al$_2$O$_3$ | 1.6632 | 9.94 |
| Substrate | FDS90 | 1.8541 | — |

Figure 10:
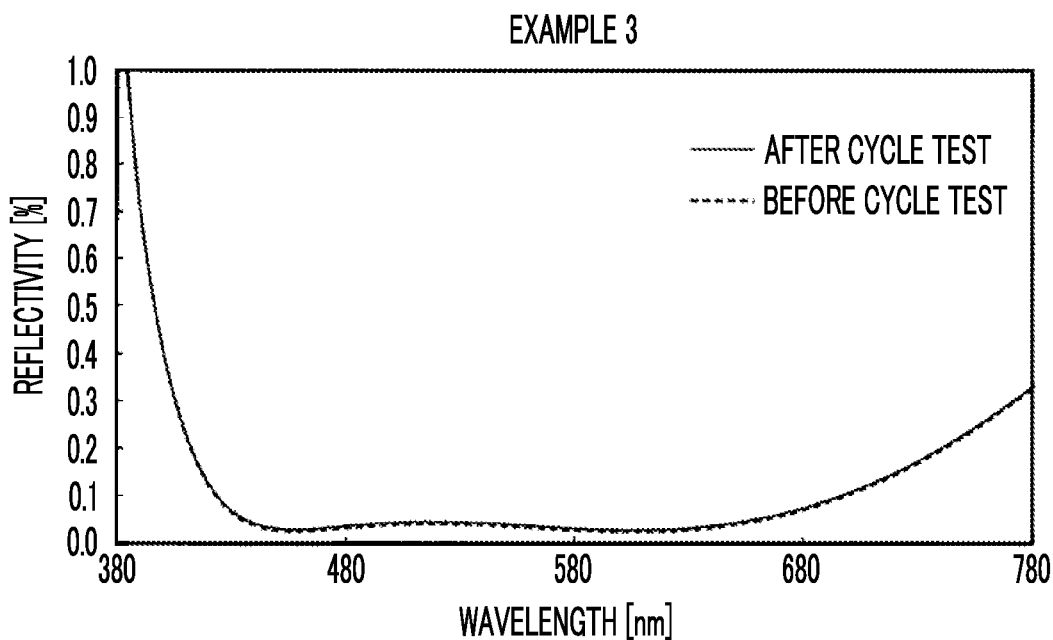
FIG. 10 is a view showing wavelength dependence of a reflectivity of an optical member of Example 3.

The wavelength dependence of the reflectivity of the antireflection film (hereinafter, referred to "wavelength dependence of the reflectivity of the optical member") of the optical member provided with the antireflection film of the example was measured before and after a reliability test (cycle test) in which the temperature was alternately changed 24 times in a range of 85° C. and −40° C. The reflectivity was measured under the condition of an incident angle of 0°. The reflectivity was measured in the same manner in the following examples. The measurement results are shown in FIG. 10. As shown in FIG. 10, since a change in the average reflection properties of the antireflection film of the example before and after the cycle test was 0.05% or less, peeling-off of the surface layer due to thermal stress does not occur. Even in the case in which the reliability test in which the film was left to stand at a high temperature of 85° C. for 24 hours was performed or the reliability test in which the film was left to stand at a low temperature of −40° C. for 24 hours was performed, peeling-off of the surface layer due to thermal stress did not occur.

Example 4

A multilayer film in which layers of titanium oxide (refractive index: 2.3194) as a high refractive index layer, and aluminum oxide (refractive index: 1.6632) as a low refractive index layer were alternately laminated on a concave lens (curvature radius: 17 mm) made of FDS90 (manufactured by HOYA Corporation, refractive index: 1.8541) as a substrate included first to fifth layers. The thermal expansion coefficient value of the first layer formed of aluminum oxide and functioning as an adhesion layer is 6×10$^{-6}$/K at a reference temperature of 25° C. In the surface layer portion of the first layer, a thin aluminum film having a film thickness of 20 nm was formed as a precursor of the surface layer having an uneven structure. The refractive index of the surface layer having the uneven structure is changed from 1 to 1.27 from the air side to the substrate side. The layer constitution from the substrate to the thin aluminum film is as shown in Table 4 below.

Then, the film was treated with hot water by immersing the film in hot water heated to 100° C. for 3 minutes to prepare a surface layer having a transparent uneven structure having an alumina hydrate as a main component. Thus, an optical member provided with an antireflection film of Example 4 was obtained.

TABLE 4

| EXAMPLE 4 (TABLE 4) | Material | Refractive index | Film thickness [nm] |
|---|---|---|---|
| Precursor | Al | 1 → 1.27 | 20 |
| First layer | Al$_2$O$_3$ | 1.6632 | 79.05 |
| Second layer | TiO$_2$ | 2.3194 | 17.99 |
| Third layer | Al$_2$O$_3$ | 1.6632 | 37.04 |
| Fourth layer | TiO$_2$ | 2.3194 | 14.35 |
| Fifth layer | Al$_2$O$_3$ | 1.6632 | 8.05 |
| Substrate | FDS90 | 1.8541 | — |

Figure 11:
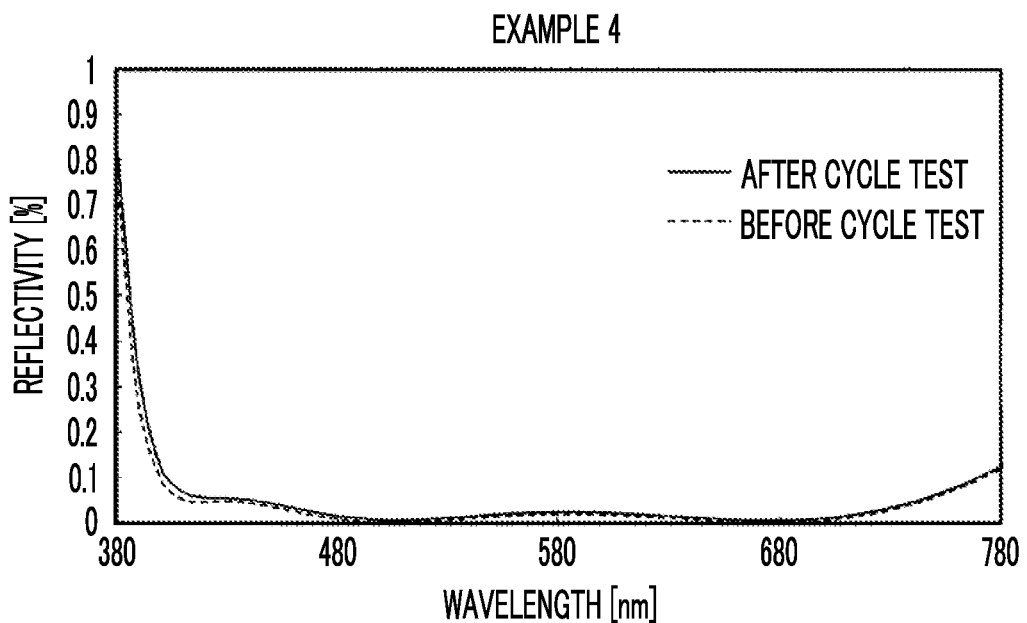
FIG. 11 is a view showing wavelength dependence of a reflectivity of an optical member of Example 4.

The wavelength dependence of the reflectivity of the antireflection film (hereinafter, referred to "wavelength dependence of the reflectivity of the optical member") of the optical member provided with the antireflection film of the example was measured before and after a reliability test (cycle test) in which the temperature was alternately changed 24 times in a range of 85° C. and −40° C. The reflectivity was measured under the condition of an incident angle of 0°. The reflectivity was measured in the same manner in the following examples. The measurement results are shown in FIG. 11. As shown in FIG. 11, since a change in the average reflection properties of the antireflection film of the example before and after the cycle test was 0.05% or less, peeling-off of the surface layer due to thermal stress does not occur. Even in the case in which the reliability test in which the film was left to stand at a high temperature of 85° C. for 24 hours was performed or the reliability test in which the film was left to stand at a low temperature of −40° C. for 24 hours was performed, peeling-off of the surface layer due to thermal stress did not occur.

Example 5

A multilayer film in which layers of tantalum pentoxide (refractive index: 2.3608) as a high refractive index layer, and nitride oxide silicon (refractive index: 1.5106, hydrogen concentration: 1.05 atomic % or 2.5 atomic %) as a low refractive index layer were alternately laminated on a concave lens (curvature radius: 17 mm) made of S-NBH5 (manufactured by Ohara Inc., refractive index: 1.6575) as a substrate included second to seventh layers, and also included a layer of hydrogenated silicon oxide (refractive index: 1.5510, hydrogen concentration: 2.5 atomic %) as a first layer for an adhesion layer. The thermal expansion coefficient value of the first layer formed of hydrogenated silicon oxide is $4.5 \times 10^{-6}$/K at a reference temperature of 25° C. In the surface layer portion of the first layer, a thin aluminum film having a film thickness of 20 nm was formed as a precursor of the surface layer having an uneven structure. The refractive index of the surface layer having the uneven structure is changed from 1 to 1.27 from the air side to the substrate side. The layer constitution from the substrate to the thin aluminum film is as shown in Table 5 below. The hydrogenated silicon oxide may contain an additive in a range having no impact on the optical properties.

Then, the film was treated with hot water by immersing the film in hot water heated to 100° C. for 3 minutes to prepare a surface layer having a transparent uneven structure having an alumina hydrate as a main component. Thus, an optical member provided with an antireflection film of Example 5 was obtained.

TABLE 5

| EXAMPLE 5 (TABLE 5) | Material | Refractive index | Film thickness [nm] |
|---|---|---|---|
| Precursor | AL | 1 → 1.27 | 20 |
| First layer | SiO$_2$—x:H (H = 2.5 atomic %) | 1.5510 | 100 |
| Second layer | SiO$_2$—x:H (H = 1.05 atomic %) | 1.5016 | 10 |
| Third layer | Ta$_2$O$_5$ | 2.3608 | 7 |
| Fourth layer | SiO$_2$—x:H (H = 2.5 atomic %) | 1.5106 | 76 |
| Fifth layer | Ta$_2$O$_5$ | 2.3608 | 14 |
| Sixth layer | SiO$_2$—x:H (H = 1.05 atomic %) | 1.5106 | 48 |
| Seventh layer | Ta$_2$O$_5$ | 2.3608 | 8 |
| Substrate | S-NBH5 | 1.6575 | — |

Figure 12:
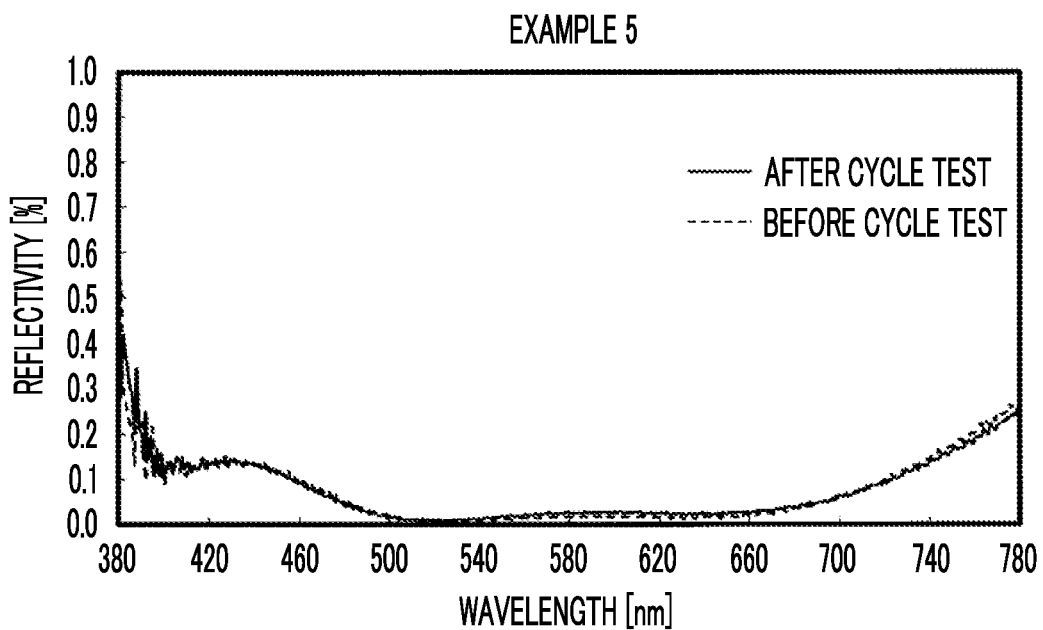
FIG. 12 is a view showing wavelength dependence of a reflectivity of an optical member of Example 5.

The wavelength dependence of the reflectivity of the antireflection film (hereinafter, referred to as "wavelength dependence of the reflectivity of the optical member") of the optical member provided with the antireflection film of the example was measured before and after a reliability test (cycle test) in which the temperature was alternately changed 24 times in a range of 85° C. and −40° C. The reflectivity was measured under the condition of an incident angle of 0°. The reflectivity was measured in the same manner in the following examples. The measurement results are shown in FIG. 12. As shown in FIG. 12, since a change in the average reflection properties of the antireflection film of the example before and after the cycle test was 0.05% or less, peeling-off of the surface layer due to thermal stress does not occur. Even in the case in which the reliability test in which the film was left to stand at a high temperature of 85° C. for 24 hours was performed or the reliability test in which the film was left to stand at a low temperature of −40° C. for 24 hours was performed, peeling-off of the surface layer due to thermal stress did not occur.

Example 6

A multilayer film in which layers of hydrogenated silicon oxide (refractive index: 1.6197, hydrogen concentration: 4.8 atomic %) as a high refractive index layer, and hydrogenated silicon oxide (refractive index: 1.4701, hydrogen concentration: 0.01 atomic %) as a low refractive index layer were alternately laminated on a concave lens (curvature radius: 17 mm) made of S-NBH5 (manufactured by Ohara Inc., refractive index: 1.6575) as a substrate included first to fourth layers. The hydrogenated silicon oxide for the high refractive index layer and hydrogenated silicon oxide for the low refractive index layer are formed into layers of hydrogenated silicon oxides having different refractive indexes by changing the hydrogen concentrations of the respective layers. The thermal expansion coefficient value of the first layer formed of hydrogenated silicon oxide and function as an adhesion layer is $8.5 \times 10^{-6}$/K at a reference temperature of 25° C. In the surface layer portion of the first layer, a thin aluminum film having a film thickness of 20 nm was formed as a precursor of the surface layer having an uneven structure. The refractive index of the surface layer having the uneven structure is changed from 1 to 1.27 from the air side to the substrate side. The layer constitution from the substrate to the thin aluminum film is as shown in Table 6 below. The hydrogenated silicon oxide may contain an additive in a range having no impact on the optical properties.

Then, the film was treated with hot water by immersing the film in hot water heated to 100° C. for 3 minutes to prepare a surface layer having a transparent uneven structure having an alumina hydrate as a main component. Thus, an optical member provided with an antireflection film of Example 6 was obtained.

TABLE 6

| EXAMPLE 6 (TABLE 6) | Material | Refractive index | Film thickness [nm] |
|---|---|---|---|
| Precursor | AL | 1 → 1.27 | 20 |
| First layer | SiO$_2$—x:H (H = 4.8 atomic %) | 1.6197 | 26 |
| Second layer | SiO$_2$—x:H (H = 0.01 atomic %) | 1.4701 | 58 |
| Third layer | SiO$_2$—x:H (H = 4.8 atomic %) | 1.6197 | 70 |
| Fourth layer | SiO$_2$—x:H (H = 0.01 atomic %) | 1.4701 | 14 |
| Substrate | S-NBH5 | 1.6575 | — |

Figure 13:
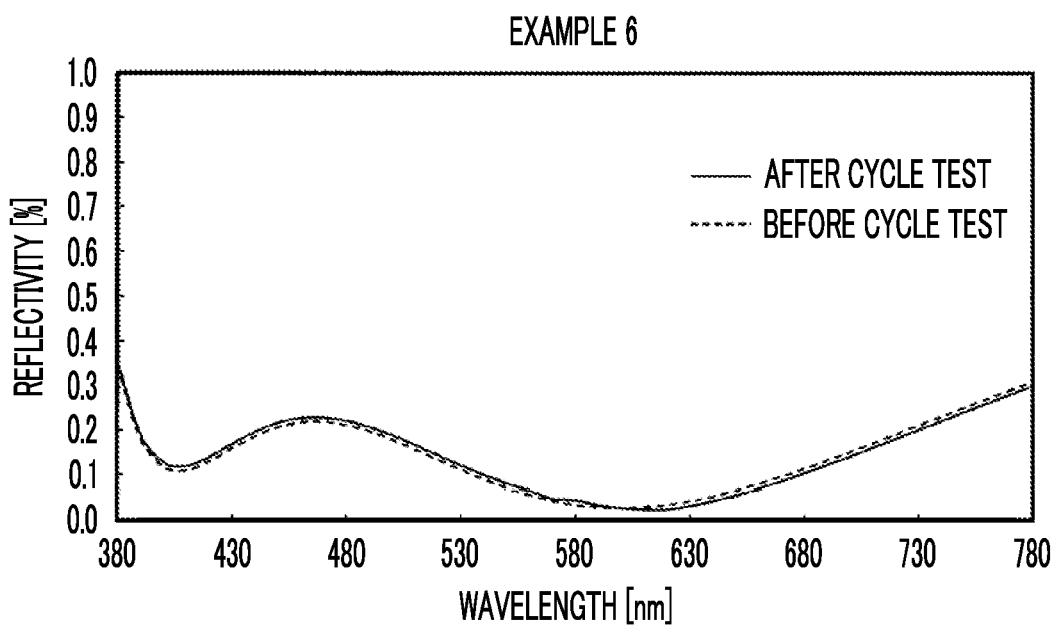
FIG. 13 is a view showing wavelength dependence of a reflectivity of an optical member of Example 6.

The wavelength dependence of the reflectivity of the antireflection film (hereinafter, referred to "wavelength dependence of the reflectivity of the optical member") of the optical member provided with the antireflection film of the example was measured before and after a reliability test (cycle test) in which the temperature was alternately changed 24 times in a range of 85° C. and −40° C. The reflectivity was measured under the condition of an incident angle of 0°. The reflectivity was measured in the same manner in the following examples. The measurement results are shown in FIG. 13. As shown in FIG. 13, since a change in the average reflection properties of the antireflection film of the example before and after the cycle test was 0.05% or less, peeling-off of the surface layer due to thermal stress did not occur. Even in the case in which the reliability test in which the film was left to stand at a high temperature of 85° C. for 24 hours was performed or the reliability test in which the film was left to stand at a low temperature of −40° C. for 24 hours was performed, peeling-off of the surface layer due to thermal stress did not occur.

The material and refractive index of the first layer of each multilayer film in Examples 1 to 6 described above, and a refractive index difference between the refractive index of the surface layer (only the uneven structure) and the refractive index of the first layer with respect to the light having a wavelength of 550 nm are shown in Table 7.

TABLE 7

| EXAMPLE | Material of first layer | Refractive index of first layer | Refractive index difference (=refractive index of first layer − refractive index of surface layer) |
|---|---|---|---|
| EXAMPLE 1 | $Ta_2O_5$ | 2.13755 | 0.86755 |
| EXAMPLE 2 | $Ta_2O_5$ | 2.13755 | 0.86755 |
| EXAMPLE 3 | $TiO_2$ | 2.3194 | 1.0494 |
| EXAMPLE 4 | $Al_2O_3$ | 1.6632 | 0.3932 |
| EXAMPLE 5 | $SiO_2$—x:H | 1.5510 | 0.281 |
| EXAMPLE 6 | $SiO_2$—x:H | 1.6197 | 0.3497 |

As described above, regarding the antireflection film disclosed in the present specification, the antireflection film is provided on the surface of the substrate and a surface layer having an alumina hydrate as a main component, in which the surface layer has only an uneven structure in which a volume proportion of the alumina hydrate per unit volume decreases in a direction from a substrate side to a surface side, and a period of apexes distributed on the uneven structure on the surface side is arranged so as to be equal to or less than a wavelength of light of which reflection is to be suppressed, an adhesion layer adjacent to the substrate side of the surface layer and formed of hydrogenated metal oxide, metal oxide, or metal fluoride is provided, and a thermal expansion coefficient value of the adhesion layer at a reference temperature of 25° C. is in a range of $0.65 \times 10^{-6}$ to $19 \times 10^{-6}$/K, and a difference in refractive index between the adhesion layer and the surface layer at an interface is 0.2 or more and 1.15 or less.

A multilayer film in which at least one or more layers of each of at least two kinds of layers of a first thin layer formed of hydrogenated metal oxide, metal oxide, or metal fluoride, and a second thin layer having a different refractive index from a refractive index of the first layer are laminated is provided between the substrate and the surface layer, and the first thin layer adjacent to the substrate side of the surface layer is the adhesion layer.

A multilayer film in which at least one or more layers of each of at least two kinds of layers of a first thin layer formed of hydrogenated metal oxide, metal oxide, or metal fluoride, and a second thin layer having a different refractive index from a refractive index of the first layer are laminated is provided between the adhesion layer and the substrate, and the adhesion layer and the thin film layer adjacent to the adhesion layer have different refractive indexes.

The adhesion layer is formed of hydrogenated silicon oxide.

The first thin layer and the second thin layer are formed of hydrogenated silicon oxides having different refractive indexes due to different hydrogen concentrations in each thin film layer.

The first thin layer and the second thin layer are formed of hydrogenated silicon oxides having different refractive indexes due to different hydrogen concentrations in each thin film layer.

The hydrogen concentration of the thin layers formed of the hydrogenated silicon oxides or the adhesion layer has any value in a range of 0.01 atomic % to 5.02 atomic %.

The multilayer film is constituted of four or more thin layers of hydrogenated silicon oxide.

A method of producing an antireflection film includes subjecting a surface layer portion formed on a surface of a substrate and having aluminum or alumina as a main component to a hydrothermal treatment, in which the surface layer portion is subjected to the hydrothermal treatment until the surface layer portion has only an uneven structure having an alumina hydrate as a main component, and the uneven structure is a structure in which a volume proportion of the alumina hydrate which forms the surface layer portion per unit volume decreases in a direction from a substrate side to a surface side of the surface layer portion.

The thickness of the surface layer portion having aluminum or alumina as a main component before the surface layer portion is subjected to a hydrothermal treatment is 20 nm or less.

A multilayer film in which a plurality of hydrogenated silicon oxide layers having different refractive indexes formed by changing a hydrogen concentration in each thin film layer is laminated is formed to be adjacent to the substrate side of the surface layer portion having the aluminum or alumina as a main component.

The present application claims foreign priority based on Japanese Patent Application (JP2015-072641) filed on Mar. 31, 2015, the content of which is incorporated herein by reference.

EXPLANATION OF REFERENCES 1, 1A: optical member
2: substrate
3, 3A: antireflection film
5: multilayer film
10: surface layer
51: first layer
52: second layer
53: third layer
54: fourth layer
55: fifth layer
56: sixth layer
57: seventh layer

What is claimed is:
1. An antireflection film that is provided on a surface of a substrate, the film comprising:
   a surface layer having an alumina hydrate as a main component,
   wherein the surface layer has only an uneven structure in which a volume proportion of the alumina hydrate per unit volume decreases in a direction from a substrate side to a surface side, and a period of apexes distributed to the uneven structure on the surface side is configured to be equal to or less than a wavelength of light of which reflection is to be suppressed,
   an adhesion layer adjacent to the substrate side of the surface layer and formed of hydrogenated metal oxide, metal oxide, or metal fluoride is provided, and
   a thermal expansion coefficient value of the adhesion layer at a reference temperature of 25° C. is in a range of $0.65 \times 10^{-6}$ to $19 \times 10^{-6}$/K, and a difference in refractive index between the adhesion layer and the surface layer at an interface is 0.2 or more and 1.15 or less.
2. The antireflection film according to claim 1,
   wherein a multilayer film in which at least one or more layers of each of at least two kinds of layers of a first thin layer formed of hydrogenated metal oxide, metal oxide, or metal fluoride, and a second thin layer having a different refractive index from a refractive index of the first layer are laminated is provided between the substrate and the surface layer, and the first thin layer adjacent to the substrate side of the surface layer is the adhesion layer.

3. The antireflection film according to claim 2, wherein the first thin layer and the second thin layer are formed of hydrogenated silicon oxides having different refractive indexes due to different hydrogen concentrations in each thin film layer.

4. The antireflection film according to claim 3, wherein the hydrogen concentration of the thin layers formed of the hydrogenated silicon oxides or the adhesion layer has any value in a range of 0.01 atomic % to 5.02 atomic %.

5. The antireflection film according to claim 3, wherein the multilayer film is constituted of four or more thin layers of hydrogenated silicon oxide.

6. The antireflection film according to claim 1, wherein a multilayer film in which at least one or more layers of each of at least two kinds of layers of a first thin layer formed of hydrogenated metal oxide, metal oxide, or metal fluoride, and a second thin layer having a different refractive index from a refractive index of the first layer are laminated is provided between the adhesion layer and the substrate, and the adhesion layer and the thin film layer adjacent to the adhesion layer have different refractive indexes.

7. The antireflection film according to claim 6, wherein the adhesion layer is formed of hydrogenated silicon oxide.

8. The antireflection film according to claim 6, wherein the first thin layer and the second thin layer are formed of hydrogenated silicon oxides having different refractive indexes due to different hydrogen concentrations in each thin film layer.

9. A method of producing an antireflection film comprising:
subjecting a surface layer portion formed on a surface of a substrate and having aluminum or alumina as a main component to a hydrothermal treatment,
wherein the surface layer portion is subjected to the hydrothermal treatment until the surface layer portion has only an uneven structure having an alumina hydrate as a main component,
the uneven structure is a structure in which a volume proportion of the alumina hydrate which forms the surface layer portion per unit volume decreases in a direction from a substrate side to a surface side of the surface layer portion, and
a multilayer film in which a plurality of hydrogenated silicon oxide layers having different refractive indexes formed by changing a hydrogen concentration in each thin film layer is laminated, is formed to be adjacent to the substrate side of the surface layer portion having the aluminum or alumina as a main component, before forming the surface layer portion.

10. The method of producing an antireflection film according to claim 9, wherein a thickness of the surface layer portion having the aluminum or alumina as a main component before the surface layer portion is subjected to a hydrothermal treatment is 20 nm or less.

* * * * *